(12) United States Patent
Biskeborn et al.

(10) Patent No.: US 9,495,981 B1
(45) Date of Patent: Nov. 15, 2016

(54) MAGNETIC TAPE HEAD CLEANING APPARATUS AND METHOD

(71) Applicant: International Business Machines Corporation, Armonk, NY (US)

(72) Inventors: Robert G. Biskeborn, Hollister, CA (US); Wlodzimierz Stanley Czarnecki, Palo Alto, CA (US); Jason Liang, Campbell, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/750,103

(22) Filed: Jun. 25, 2015

(51) Int. Cl.
*G11B 5/41* (2006.01)
*G11B 15/03* (2006.01)
*G11B 15/087* (2006.01)
*G11B 5/008* (2006.01)
*G11B 15/18* (2006.01)
*G11B 15/67* (2006.01)

(52) U.S. Cl.
CPC ............. *G11B 5/41* (2013.01); *G11B 5/00813* (2013.01); *G11B 15/03* (2013.01); *G11B 15/087* (2013.01); *G11B 15/1883* (2013.01); *G11B 15/672* (2013.01)

(58) Field of Classification Search
None
See application file for complete search history.

(56) References Cited

U.S. PATENT DOCUMENTS

| | | | |
|---|---|---|---|
| 4,467,382 A | 8/1984 | Huisman | |
| 5,495,371 A * | 2/1996 | Munemoto et al. | G11B 5/41 360/69 |
| 5,739,970 A | 4/1998 | Kobayashi et al. | |
| 5,930,089 A | 7/1999 | Anderson | |
| 6,157,505 A * | 12/2000 | Prockup | G11B 27/36 360/31 |
| 6,417,977 B1 * | 7/2002 | Ohta et al. | G11B 5/41 360/31 |
| 7,656,602 B2 | 2/2010 | Iben et al. | |
| 7,724,472 B2 | 5/2010 | Biskeborn et al. | |
| 7,782,567 B2 | 8/2010 | Biskeborn et al. | |
| 8,643,974 B1 | 2/2014 | Partee et al. | |
| 8,737,007 B2 | 5/2014 | Poorman et al. | |
| 8,804,277 B2 | 8/2014 | Gale et al. | |
| 2007/0133127 A1 * | 6/2007 | Stamm et al. | G11B 5/41 360/128 |
| 2012/0320470 A1 * | 12/2012 | Thompson et al. | G11B 23/502 360/53 |

* cited by examiner

*Primary Examiner* — Craig A. Renner
(74) *Attorney, Agent, or Firm* — Jennifer M. Anda; Samuel A. Waldbaum

(57) ABSTRACT

Preventing accumulations on read/write (R/W) elements of a tape appliance tape head. Power and current to the R/W elements of the tape head are turned off. A tape head cycle using a tape cartridge is then performed. In another aspect of the invention, the tape cartridge is a standard tape cartridge. Tape processing of the standard tape cartridge is suspended. The tape head cycle is performed using the standard tape cartridge. Tape processing of the standard tape cartridge is then resumed.

10 Claims, 7 Drawing Sheets

MAGNETIC TAPE HEAD CLEANING APPARATUS AND METHOD

BACKGROUND

The present invention relates generally to the field of magnetic tape information storage and retrieval appliances, and more particularly to preventing accumulations from building up on the tape heads of a tape appliance.

Accumulations, including deposits and stain, on the tape heads on a tape appliance that occur during normal use may degrade the performance of the appliance, typically by physically pushing apart the tape medium and the tape heads. This increased distance may lead to an unacceptable degree of spacing loss in the magnetic field strength detected by the read heads, causing a low signal resolution and an unacceptable bit error rate. Spacing loss may be modeled based on the Wallace thickness loss response function, in which the magnetic field strength detected by a read element is proportional to $e^{-kd/\lambda}$, where d is the element-to-tape separation, $\lambda$ is the recording wavelength, and k is a constant equal to $2\pi f/s$, where f=recording frequency, and s=tape speed in recording. Thus, for a given tape generation, the detected magnetic field strength decreases exponentially with respect to separation between the tape and the read element.

The accumulations may be characterized into a few distinct types: predominantly magnetic particle deposits, predominantly polymer deposits, particles from the environment, and stain. The magnetic particle deposits and the polymer deposits are typically loose particles that are shed from one or more layers of the magnetic tape media as it passes over the tape heads. The environmental accumulations are typically airborne particulate contaminants in the tape appliance operating environment that become trapped at the tape head-tape interface. Stain is particles of any type that adhere to the tape head and are difficult to remove, for example, by standard production cleaning tapes or other routine maintenance. Tape stain formation may be an electro-mechanical-chemical process in which an accumulation of lubrication products, head wear products, and other detritus produced from the head and tape builds up on the tape head elements, for example, shields, poles, substrates, reader elements, etc. Accumulations of different types may collect at different locations of a tape head. Because stain typically collects near the pole tips of the tape heads and is difficult to remove, it may disproportionately cause increased head-tape spacing, even though its thickness is only of the order of a few nanometers.

Regular tape head cleaning may remove some or most of the accumulations on the tape head. Typically, at regular intervals, a special cleaning cartridge is mounted in the tape appliance and the tape medium of the cleaning cartridge is moved across the tape heads. The interval may be based on, for example, tape appliance operating hours, number of tape mounts, bit errors occurring above a threshold bit error rate, etc. The cleaning cartridge typically includes an unrecorded tape medium having a surface composition that is more abrasive than the surface of the standard tape medium for the tape appliance. The friction of the cleaning tape medium against the tape heads physically removes the accumulations. Because of the abrasive nature of the tape cleaning cartridge, the frequency of use of the cleaning cartridge should be regulated to not cause excessive wear of the tape heads. Because cleaning cartridges have a useful lifespan of typically around 50 cleaning cycles, the number of cleaning cycles per cleaning cartridge should be tracked. In addition to periodic use of a cleaning cartridge, special procedures may be required to remove accumulated stain on the tape heads. These procedures may include manual cleaning of the tape heads with special solvents.

While frequent use of a cleaning cartridge may reduce the buildup of accumulations on the tape head, especially difficult to remove stain deposits, frequency of use should be balanced against the accelerated wear of the tape heads that will occur with too frequent use of cleaning cartridges.

SUMMARY

Embodiments of the present invention disclose a method and tape appliance for preventing accumulations from building up on the read/write (R/W) elements of a tape appliance tape head. Power and current to the R/W elements of the tape head are turned off. A tape head cycle using a tape cartridge is then performed.

In another aspect of the invention, the tape cartridge is a standard tape cartridge. Tape processing of the standard tape cartridge is suspended. The tape head cycle is performed using the standard tape cartridge. Tape processing of the standard tape cartridge is then resumed.

DETAILED DESCRIPTION

Embodiments of the present invention are directed to an improved method of reducing or preventing accumulations on the R/W heads of a tape appliance. The method was discovered serendipitously, and results in a surprising and unexpectedly high degree of accumulation reduction and prevention, particularly at the read elements.

Generally, the method involves initiating a tape head "cleaning" cycle during regular operational use of a standard production tape cartridge, for example, after a read or write operation has completed. The power and current to the tape heads is turned off, the tape head "cleaning" cycle is performed using the tape medium of the production tape cartridge, the power and current to the tape heads is turned back on, and regular operational use of the production tape cartridge is resumed. The term "tape head cycle" is used herein to indicate a "cleaning" cycle using a production, or standard, tape cartridge in accordance with embodiments of the invention, and to distinguish this cycle from a typical cleaning cycle that uses a special purpose cleaning cartridge.

Discovery of the inventive method resulted from a particular arrangement of read/write elements in a particular generation of tape heads. In these tape heads, there are 33 read/write elements arranged longitudinally on a tape head assembly. For illustrative purposes, the read/write elements may be consecutively labeled 0 to 32. Depending on the direction of tape travel over of tape head assembly, either elements 0 to 31, or elements 1 to 32, are used. In this arrangement, power and current to the outermost read/write elements, labeled here as 0 and 32, is turned off, including the standby current to the read elements, if the read/write element is not being used.

In the course of determining an effective tape head cleaning regimen, the tape heads were examined for accumulations, including deposits and stain. The Inventors were surprised to discover that cleaning cycles that were performed on the tape heads resulted in read/write elements 0 and 32, particularly, the read elements, having unexpectedly low levels of accumulations. Although the exact mechanism that results in the unexpectedly low levels of accumulations is not known by the Inventors at this time, a common element in the various arrangements is a reduced or turned off power and current to a tape head element during at least a portion of a cleaning cycle.

Figure 2:
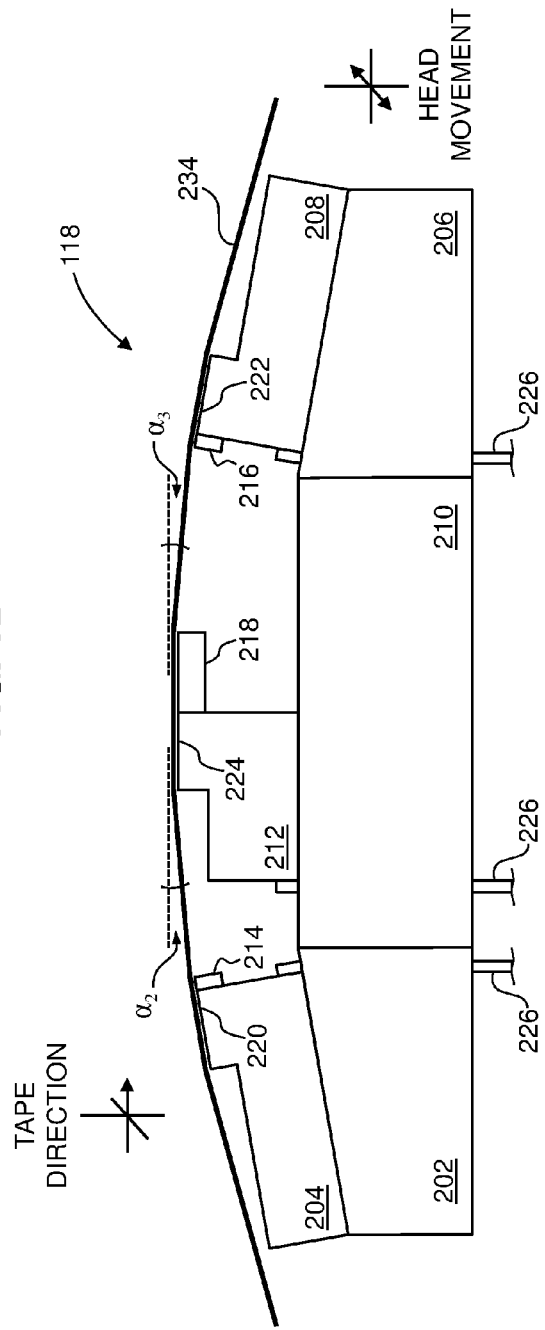
FIG. 2 illustrates a side view of a read/write head, in accordance with an embodiment of the invention.
Figure 5:
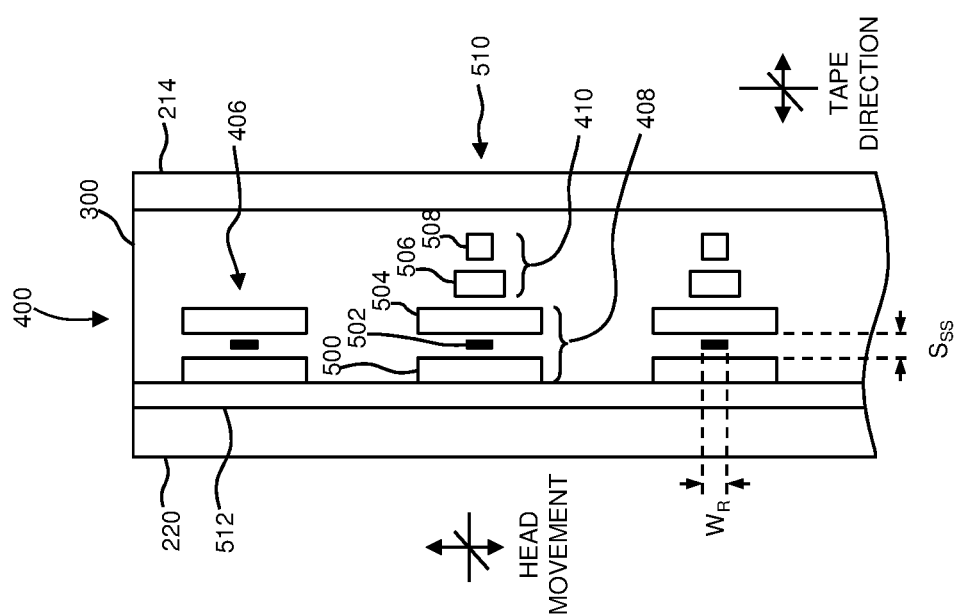
FIG. 5 illustrates a representative partial tape bearing surface, illustrating a read/write element array in additional detail, in accordance with an embodiment of the present invention.

The inventors discovered the unexpected result that when tape heads are operated in writing and reading modes, read elements that are periodically unpowered for at least a portion of a tape cycle are not subject to signal degradation due to spacing increase caused by accumulations of media components that often appear above energized elements. This may particularly be observed in tape head structures comprised of modules having only either read or write functions, for example, as shown in FIG. 2 below, but not both. This is because in such heads, unused readers are not heated by energized writers, as is the case for piggybacked or merged head structures, for example, as shown in FIG. 5. The discovered effects disclosed herein include reading in an interleaved or partially interleaved manner, or for example, reading legacy formats requiring fewer simultaneous channels, for example, as with a 32 channel head operating in legacy 16 channel mode. While the observations disclosed herein are for read heads, the same reasoning applies to any transducer that runs at a higher than ambient temperature during operation, including readers, writers, servo readers.

Figure 1A:
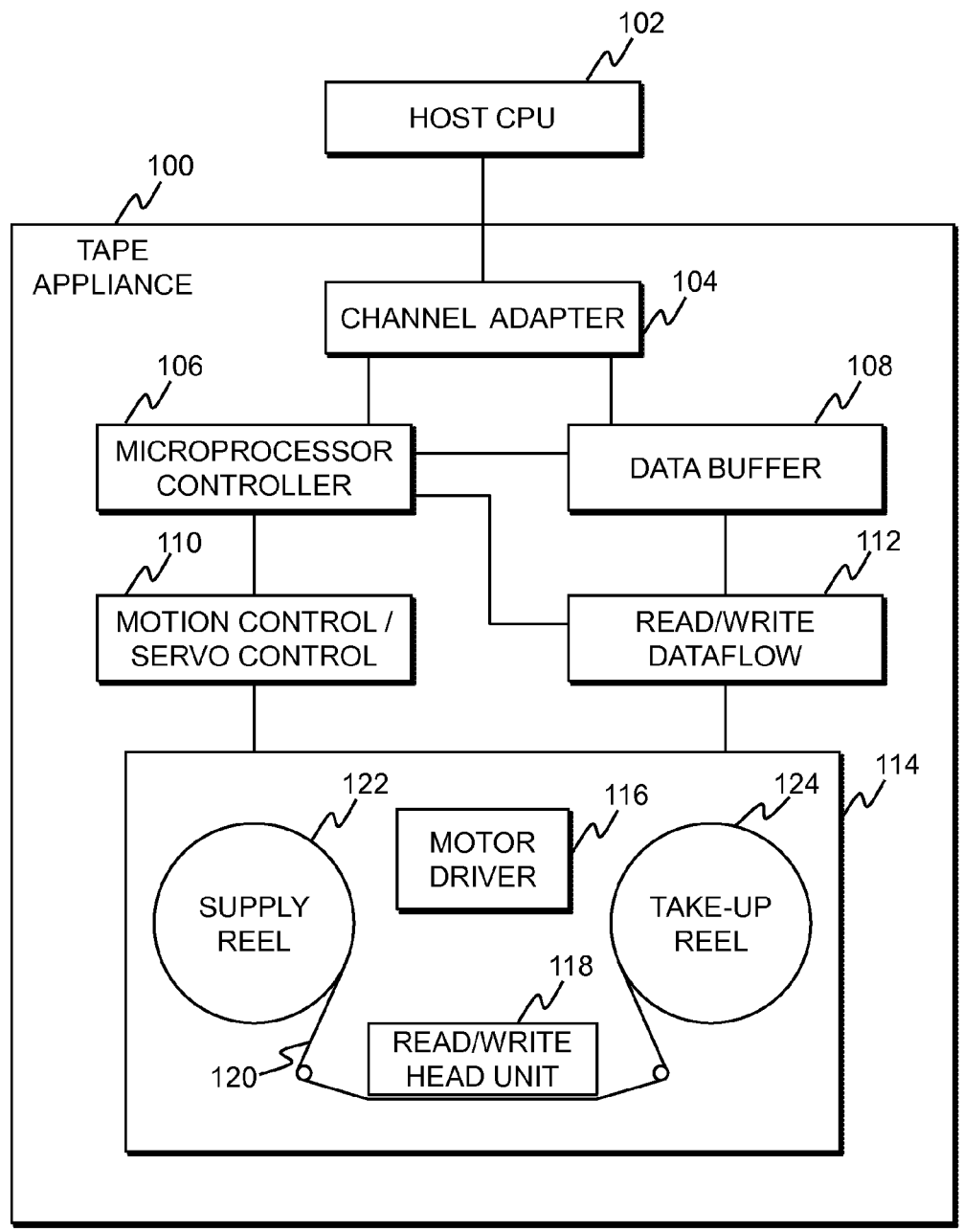
FIG. 1A is a functional block diagram illustrating a tape recording appliance, in accordance with an embodiment of the present invention.

FIG. 1 is a functional block diagram of a tape appliance 100, in accordance with an embodiment of the invention. In an exemplary embodiment, tape appliance 100 may be a production tape drive. Tape appliance 100 may include several components providing a control and data transfer system for reading and writing data from a host CPU 102, an embodiment of which is described below in relation to FIG. 7, to a magnetic tape medium. Tape appliance 100 may include a channel adapter 104, a computer, such as microprocessor controller 106, a data buffer 108, a read/write data flow circuit 112, a motion control system 110, and a tape interface system 114 that includes a motor driver circuit 116 and read/write head unit 118.

Microprocessor controller 106 may provide overall control functionality for the operations of all other components of tape appliance 100. The functions performed by microprocessor controller 106 may be programmable via microcode routines (not shown) according to desired tape drive operational characteristics. During data write operations (with all dataflow being reversed for data read operations), microprocessor controller 106 activates channel adapter 104 to perform the required host interface protocol for receiving an information data block. Channel adapter 104 communicates the data block to the data buffer 108 that stores the data for subsequent read/write processing. Data buffer 108 in turn communicates the data block received from channel adapter 104 to read/write dataflow circuitry 112, which formats the device data into physically formatted data that may be recorded on a magnetic tape medium. Read/write dataflow circuitry 112 is responsible for executing all read/write data transfer operations under the control of microprocessor controller 106. Read/write dataflow circuitry 112 may also control various operational aspects of tape heads. For example, read/write dataflow circuitry 112 may, at the direction of microprocessor controller 106, control the operational voltage levels of the tape head circuitry. These voltages may include the write head voltage applied during write operations, which may typically be from 3V to 6V, and a standby current that is constantly applied to the read heads between read operations for the purpose of preventing corrosion of the heads. The standby current us typically sufficient to keep the temperature of the read heads above the operating environment dew point to avoid the accumulation of water condensation on the read heads. Formatted physical data from read/write circuitry 112 is communicated to tape interface system 114. The latter includes one or more read/write modules in read/write head unit 118, and drive motor components (not shown) for performing forward and reverse movement of a tape medium 120 mounted on a supply reel 122 and a take-up reel 124. The drive components of tape interface system 114 are controlled by motion control system 110 and motor driver circuit 116 to execute such tape movements as forward and reverse recording and playback, rewind and other tape motion functions. In addition, in multi-track tape drive systems, motion control system 110 transversely positions read/write heads in read/write head unit 118 relative to the direction of longitudinal tape movement in order to record data in a plurality of tracks.

In various embodiments, during read operations, microprocessor controller 106 may receive the unformatted electrical signals from tape interface system 114, either directly or via read/write dataflow circuitry 112. In other embodiments, read/write dataflow circuitry 112 may perform various pre-processing functions on the electrical signals from tape interface system 114, and transmit information that is representative of the electrical signals to microprocessor controller 106. In these embodiments, microprocessor controller 106 may include appropriate electrical circuitry, logic, firmware, software, etc., to perform analysis of the electrical signals or information to determine various characteristics of the signals related to quality of the recorded data and the magnetic medium, in accordance with embodiments of the invention. In general, the appropriate electrical circuitry, logic, firmware, software, etc., to perform analysis of the electrical signals to determine various characteristics of the signals related to quality of the recorded data and the magnetic medium may be located in one or more functional components of a tape appliance, such as tape appliance 100, and/or in a host computer, such as host CPU 102.

Figure 1B:
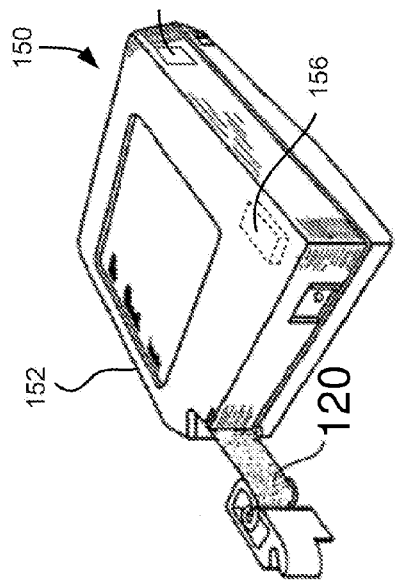
FIG. 1B illustrates an exemplary tape cartridge, in accordance with an embodiment of the present invention.

FIG. 1B illustrates an exemplary tape cartridge 150 according to an embodiment of the invention. Tape cartridge 150 may be used with a system such as tape appliance 100 shown in FIG. 1A. As shown, tape cartridge 150 includes a housing 152, a tape 120 in the housing 152, and may include a nonvolatile memory 156 coupled to the housing 152. The nonvolatile memory may be accessible by tape appliance 100, and the tape operating software (the driver software) residing on host CPU 102. In an exemplary embodiment, tape cartridge 150 meets the standards specifications of one or more of the Linear Tape Open (LTO) generations, such as LTO-6. All trademarks used herein are the property of their respective owners. In such an embodiment, supply reel 122 may be integral to the LTO tape cartridge, and the end of tape 120 includes a leader pin (not shown) which is mechanically grasped by features (not shown) of tape interface system 114 and threaded onto tape-up reel 124.

FIG. 2 illustrates a functional schematic side view of read/write head unit 118 in accordance with an embodiment of the invention. Read/write head 118 includes first, second and third modules 204, 212, and 208, respectively, mounted to bases 202, 210, and 206, respectively. The bases may be "U-beams" that are physically coupled together. First, second and third modules 204, 212, and 208 each have a tape bearing surface 220, 224, and 222 respectively, which may be flat, contoured, etc. Each module 204, 212, and 208 may be configured for writing and/or reading data, for example, data received from or transmitted to host CPU 102, to and from a tape 234. Modules 204, 212, 208 may receive data for writing and transmit data that is read via cables 226, which may couple the modules to read dataflow circuitry 112. Note that while the term "tape bearing surface" appears to imply that the surface facing tape 234 is in physical contact with the tape bearing surface, this is not necessarily the case. Rather, only a portion of the tape may be in contact with the tape bearing surface, constantly or intermittently, with other portions of the tape "flying" above the tape bearing surface on a layer of air, usually referred to as an "air bearing." By way of explanation, first module 204 can be referred to as the "leading" module as it is the first module encountered by tape 234 when moving from left to right, as illustrated. Second module 212 can be referred to as the "middle" module, and third module 208 can be referred to as the "trailing" module. The leading and trailing modules 204 and 208, respectively, are referred to collectively as outer modules. Note that outer modules 204 and 208 will alternate as leading modules, depending on the direction of travel of the tape 234.

In an exemplary embodiment, closures 214, 218, and 216 are attached to modules 204, 212, and 208, respectively, and serve to extend tape bearing surfaces 220, 224, and 222, and to define gaps at the junctions of the modules and closures in which tape read and write elements, described in more detail below, are disposed. Locating the read and write elements interior to the edges of the tape bearing surfaces may serve to reduce wear and tear of the read/write elements resulting from direct contact from tape 234. Modules 204, 212, and 208, and closures 214, 218, and 216 may be made of a wear resistant substrate material, such as a ceramic. In some embodiments, middle module 212 has a closure, while the outer modules 204, 208 do not. Where there is no closure, preferably a hard coating is added to the module. One preferred coating is diamond-like carbon (DLC).

In one embodiment, tape bearing surfaces 220, 224, and 222 of the first, second and third modules 204, 212, and 208, respectively, lie on approximately parallel planes, with tape bearing surface 224 of the middle module 212 being slightly above tape bearing surfaces 220 and 222 of the outer modules 204 and 208. As described below, this has the effect of creating a desired wrap angle $\alpha_2$ of the tape relative to the tape bearing surface 224 of the middle module 212.

Tape bearing surfaces 220 and 222 may include sharp outer edges, or "skiving" edges, where tape 234 will first contact tape bearing surfaces 220 and 222 when either outer module 204 and 208 is the leading module. The skiving edges serve to "shear" air from the underside of tape 234 to prevent air from being drawn into the head-tape gap by the tape, so that atmospheric pressure may push the tape into substantially full contact, i.e., with a small tape fly height, over the longitudinal dimension, with respect to tape direction, of the tape bearing surfaces. A small amount of roundness or slope at the incoming edge may generate an unacceptably thick air bearing, separating the tape from the head, and its read/write elements, as described below, and present problems in reading and writing high density recordings due to spacing loss effects.

Where the tape bearing surfaces 220, 224, and 222 lie along approximately parallel offset planes, the vacuum created by the skiving edge of tape bearing surface 220 of the leading module 204 results in the trailing edge of tape bearing surface 220 (the edge from which the tape leaves the leading module 204) being the approximate reference point which defines the wrap angle $\alpha_2$ over the tape bearing surface 224 of the second module 212. Because the tape stays in close proximity to tape bearing surface 220 until close to its trailing, read and/or write elements, described in more detail below, may be located near the trailing, or inner, edges of the outer modules 204, 208.

A benefit of this and similar embodiments is that, because the tape bearing surfaces 220 and 222 of outer modules 204, 208 are fixed at a determined vertical offset from the tape bearing surface 224 of the middle module 212, the inner wrap angle $\alpha_2$ is fixed when modules 204, 212, and 208 are physically coupled together or are otherwise fixed into a head assembly. The inner wrap angle $\alpha_2$ is approximately tan$-1(\delta/W)$ where $\delta$ is the height difference between the planes of the tape bearing surfaces 220 and 224, and W is the width between the opposing ends of the tape bearing surfaces 220 and 224. An illustrative inner wrap angle $\alpha_2$ is in a range of about 0.5° to about 1.1°, though can be any angle that is advantageous to a design. Beneficially, the inner wrap angle $\alpha_2$ on the side of middle module 212 receiving the tape (leading edge) will be larger than the inner wrap angle $\alpha_3$ on the trailing edge, as the tape 234 rides above tape bearing surface 222 of trailing module 208. This difference is generally beneficial as a smaller $\alpha_3$ tends to oppose what has heretofore been a steeper exiting effective wrap angle.

Note that the tape bearing surfaces 220, 222 of the outer modules 204, 208 are positioned to achieve a negative wrap angle at the trailing edge of the tape bearing surface 220 of the leading module 204. This is generally beneficial in helping to reduce friction due to contact with the trailing edge, provided that proper consideration is given to the location of the "crowbar" region, where the tape forms a slight bubble, that forms in the tape where it peels off the head. This negative wrap angle also reduces flutter and scrubbing damage to the elements on leading module 204. Further, at trailing module 208, tape 234 flies over the tape bearing surface 222 so there is virtually no wear on the elements when tape is moving in this direction. Particularly, tape 234 entrains air and so will not significantly ride on the tape bearing surface 222 of the trailing module 208 (although some contact may occur). This is permissible in certain embodiments, for example, where the leading module writes onto the tape, the middle module may perform a read-after-write function, and the trailing module 208 is idle.

Writing and reading functions may be performed by different modules at any given time. In one embodiment, middle module 212 includes a plurality of data and optional servo readers and no data writers. Outer modules 204, 208 may include a plurality of writers and no readers, with the exception that outer modules 204, 208 may include optional servo readers. The servo readers may be used to laterally position the head, with respect to tape direction, during reading and/or writing operations.

In the embodiment illustrated in FIG. 2, modules 204, 212, 208 each have a closure 214, 218, 216, which extends the tape bearing surface of the associated module, thereby effectively positioning the read/write elements away from the edge of the tape bearing surface. Closure 218 on second module 214 can be a ceramic closure of a type typically found on tape heads. The closures 214, 216 of the outer modules 204, 208, however, may be shorter than closure 218 of second module 212 as measured parallel to a direction of tape travel over the respective module. This enables positioning the modules closer together. One way to produce shorter closures 214, 216 is to lap the standard ceramic closures of the second module 212 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 214, 216 or no closures on the outer modules 204, 208, the write-to-read gap spacing can be reduced to less than about 1 mm, e.g., about 0.75 mm, or 50% less than standard LTO tape head spacing. The open space between the modules 204, 212, 208 can still be set to approximately 0.5 to 0.6 mm, which in some embodiments is ideal for stabilizing tape motion over the second module 212.

In alternative embodiments, depending on tape tension and stiffness, it may be desirable to angle the tape bearing surfaces of the outer modules relative to the tape bearing surface of the middle module. For example, the tape bearing surfaces of the outer modules may be about parallel to the tape at the desired wrap angle $\alpha_2$ of the middle module. In other words, the planes of the tape bearing surfaces of the outer modules are oriented at about the desired wrap angle $\alpha_2$ of the tape relative to the middle module. The tape will also pop off of the trailing module in this embodiment, thereby reducing wear on the elements in the trailing module. These embodiments are particularly useful for write-read-write applications. Additional aspects of these embodiments are similar to those given above.

In operation, as tape 234 passes over the read and write elements in tape bearing surfaces 220, 224, 222 of read/write head unit 118, motion control system 110 transversely positions read/write head unit 118 relative to the direction of longitudinal tape movement in order to read data from or write data to the data tracks in a particular data band of tape 234, as will be described in more detail below.

Figure 3:
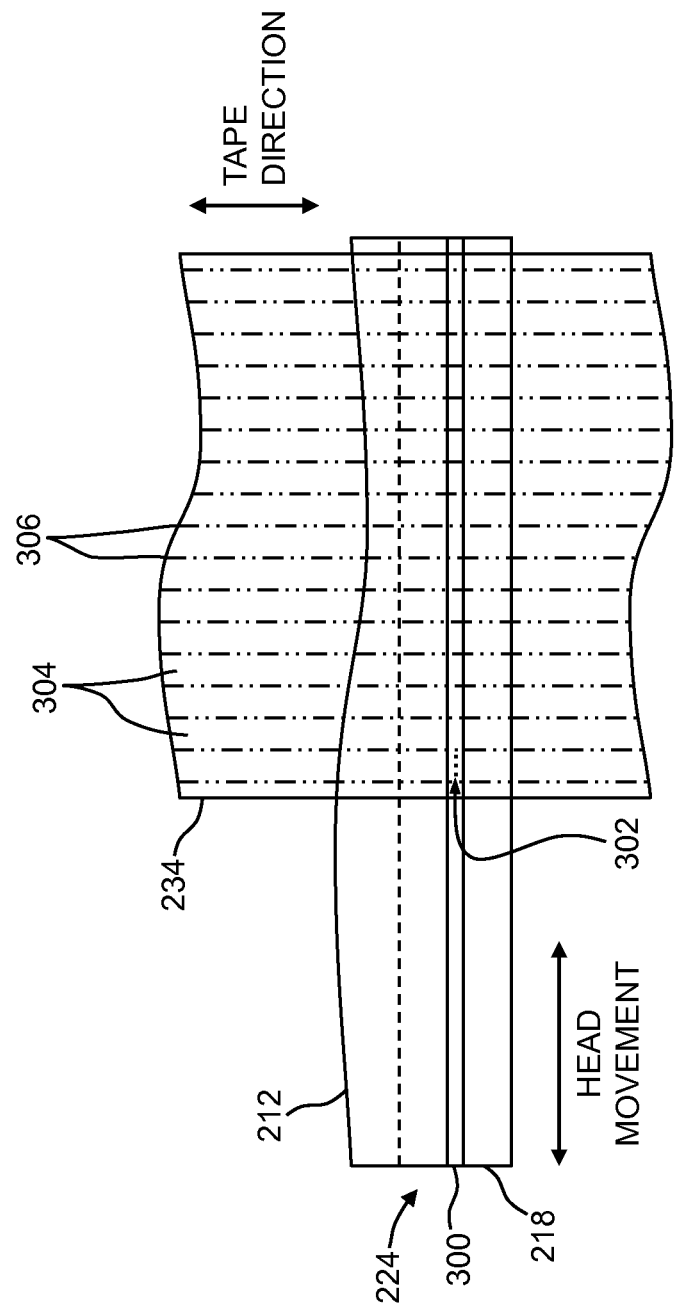
FIG. 3 illustrates a representative tape bearing surface of a module, in accordance with an embodiment of the present invention.

FIG. 3 illustrates a representative tape bearing surface 224 of module 212, from the perspective of a downward view, in accordance with an embodiment of the present invention. A representative tape 234 is shown, with servo tracks 306 indicated in dashed lines, and data bands 304 between the servo tracks 306. In this example, tape 234 includes 4 to 22 data bands 304, e.g., with 16 data bands 304 and 17 servo tracks 306, on a one-half inch wide tape 234. Each data band may include a number of data tracks, for example 1024 data tracks (not shown). Module 204 is preferably long enough to be able to support tape 234 as the head steps between data bands 304. During read/write operations, read and/or write elements of read/write element array 302, disposed in a gap 300 of tape bearing surface 224 of module 212 where the tape bearing surface of closure 218 abuts module 224, are positioned to specific track positions within one of the data bands 304. Outer read elements of read/write element array 302, which may be referred to as servo readers, read the servo tracks 306. The servo signals generated by the servo readers and received by motion control system 110 are used to align the read and/or write elements 302 with a particular set of data tracks during read/write operations.

Figure 4:
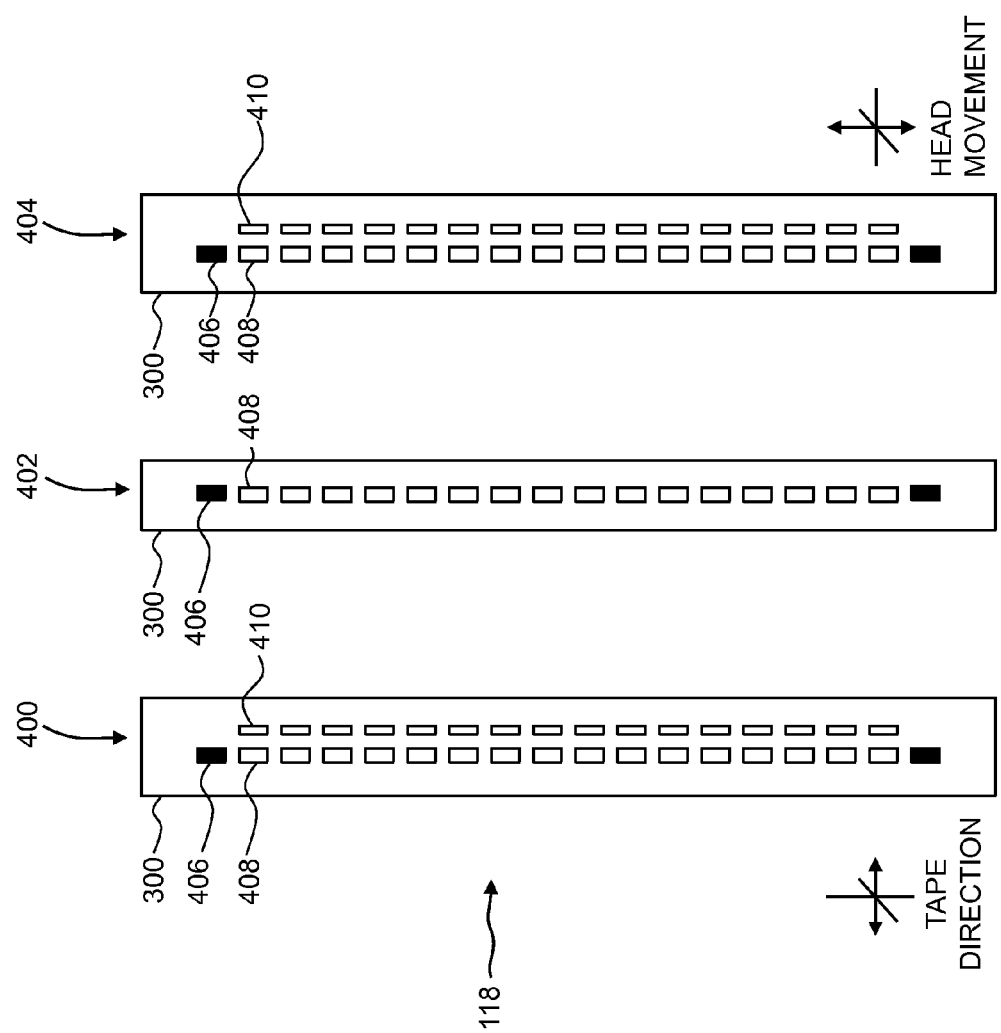
FIG. 4 illustrates read and/or write element arrays, in accordance with an embodiment of the present invention.

FIG. 4 depicts read and/or write element arrays 400, 402, and 404 of read/write head unit 118, which may be formed, for example, in gaps 300 of modules 204, 212, and 208. As shown, the read and/or write element arrays may include, for example, 16 read elements 408, 16 write elements 410, and two servo readers 406, though the number of elements may vary. Illustrative embodiments may include 8, 16, 32, 40, or 64 active read and/or write elements per array, and, alternatively, interleaved designs having odd numbers of read or write elements such as 17, 25, 33, etc. An illustrative embodiment includes 32 read elements per array and/or 32 write elements per array, where the actual number of transducer elements could be greater, e.g., 33, 34, etc. This may allow the tape to travel more slowly, thereby reducing speed-induced tracking and mechanical difficulties and/or execute fewer "wraps" to fill or read the tape. While the read and write elements may be arranged in a "piggyback" configuration as shown in FIG. 4, for example, in read/write element arrays 400 and 404, the read elements 408 and write elements 410 may also be arranged in an interleaved configuration. Alternatively, each array of read and/or write elements 400, 402, 404 may be read or write elements only, and the arrays may contain one or more servo readers 406. Each module 204, 212, 208 may include a complementary set of read and/or write elements for such things as bi-directional reading and writing, read-while-write capability, backward compatibility, etc.

FIG. 5 shows a representative partial tape bearing surface 220 of module 204 of read/write head heads 118, from the perspective of a downward view, illustrating representative read/write element array 400 in additional detail, in accordance with an embodiment. A read/write element array 400 may have a plurality of read/write element (R/W) pairs 510 in a piggyback configuration formed, for example, on the substrate material of module 204 and an optional electrically insulative layer 512. The write elements, exemplified by write element 410, and the read elements, exemplified by read element 408, are aligned parallel to the direction of travel of a tape medium to form a R/W pair 510. Several R/W pairs 510 may be present, such as 8, 16, 32 pairs, etc. The R/W pairs 510 as shown are linearly aligned in a direction generally perpendicular to the direction of tape travel. However, the pairs may also be aligned diagonally, etc. Servo readers 406 are positioned on the outside of the array of R/W pairs 510.

Generally, the magnetic tape medium may move transversely across read/write element arrays 400, 402, and 404 in either direction, and read/write heads 118 may be moved laterally, with respect to the tape direction, between data tracks and data bands 304 on the tape. The magnetic tape medium and read and/or write element arrays 400, 402, and 404 operate in a transducing relationship in a manner known in the art.

In an embodiment, when a module is constructed, for example, module 204, layers are formed in the gap 300 created above the electrically conductive substrate material of module 204 (partially shown), e.g., of AlTiC, in generally the following order for the R/W pairs 510, and similarly for servo readers 406 (however, without the writer poles): an insulating layer 512; a first shield 500 typically of an iron alloy such as NiFe, CZT or Al—Fe—Si (Sendust); a sensor 502 for sensing a data track on a magnetic medium of any known type, including those based on magnetoresistance (MR), giant MR (GMR), anisotropic MR (AMR), tunneling MR (TMR), etc.; a second shield 504 typically of a nickel-iron alloy (e.g., ~80/20 at % NiFe, also known as permalloy); first and second writer pole tips 506, 508, and a coil (not shown). First and second writer poles 506, 508 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Although read/write element array 400 includes R/W pairs 510, read/write element arrays may include only read elements or only write elements. For example, in the embodiment illustrated in FIG. 4, read/write element array 402 of module 212 includes only read elements. Other embodiments may include different combinations read/write element arrays, to enable, for example, write-read-read (W-R-R) operations, R-R-W operations, read-after-write operations, etc. One skilled in the art will appreciate that the concepts presented as applied to the embodiments disclosed would apply to configurations other than those illustrated.

In various embodiments, read sensor width $W_R$, and read sensor shield-to-shield spacing $S_{SS}$, as illustrated on FIG. 5, may be optimized for track density, linear density (bits/inch), head-to-tape spacing, and/or other physical and magnetic properties of a particular generation of tape, for example, LTO-6. In an exemplary embodiment, shield-to-shield spacing $S_{SS}$ may have a nominal value of about 100 nm, and read sensor width $W_R$ may have a nominal value of about 0.2-5.0 µm. More generally, the shield-to-shield spacing $S_{SS}$ scales with the bit length, as is known in the art, and the reader width may be in the range of 40-80 percent of the track width.

Figure 6:
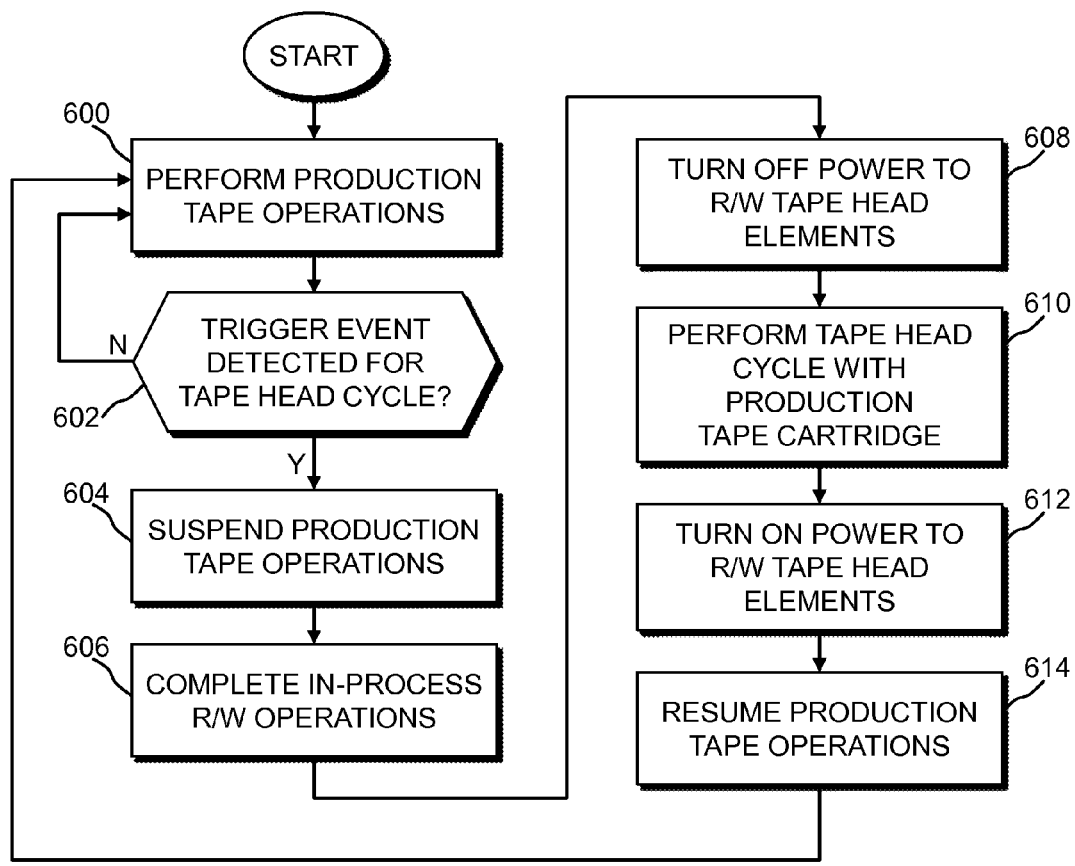
FIG. 6 is a flowchart depicting operational steps that a microprocessor may perform, in accordance with an embodiment of the invention.

FIG. 6 is a flowchart depicting operational steps that microprocessor controller 106 may perform, in accordance with an embodiment of the invention. In an embodiment, tape appliance 100 may be performing standard production tape operations on a mounted tape cartridge 150, such as reading from and writing to the tape media 120/234 of the tape cartridge 150 (step 600).

During the production tape operations to the mounted tape cartridge 152, microprocessor controller 106 may monitor for a triggering event that indicates that a tape head cycle should be performed (step 602). In an exemplary embodiment, triggering events are directed to preventing the buildup of accumulations on the tape heads. Triggering events may include, for example, microprocessor controller 106 determining that a certain number of wraps of a tape cartridge 152 has passed over read/write head unit 118 since the last tape head cycle was executed, a certain length of tape 120 has passed over read/write head unit 118 since the last tape head cycle was executed, a certain amount of tape appliance operating hours have elapsed since the last tape head cycle was executed, or a combination of one or more of the above conditions has occurred since the last tape head cycle was executed. In various embodiments, triggering events may also include that the performance of one or more read elements 408 and/or write elements 410 of read/write element array 400 of read/write head unit 118 is below a threshold value. For example, the bit error rate detected by one or more of the read elements 408 during a write verify operation is above a predefined threshold quality value.

Microprocessor controller 106 may suspend production tape operations, for example, by responding with "not ready" to read or write requests from host computer 102 (step 604), and may complete R/W operations that are in process or in queue (step 606). In certain embodiments, microprocessor controller 106 may halt any in process R/W operations for later resumption.

After all R/W operations have been suspended, microprocessor controller 106 may turn off power and current to, for example, all R/W elements 408/410 of read/write element array 400 of read/write head unit 118 (step 608). This may include deenergizing the read elements by turning off the standby current and waiting until the temperature of the read heads, for example, at the polls, is within 0.1° C. of the ambient air temperature.

Microprocessor controller 106 then performs a tape head cycle using the already mounted standard tape cartridge (step 610). This may include, for example, one or more wraps of the production tape cartridge at a production tape speed.

After the tape head cycle has completed, power and current to the R/W elements of, for example, tape head 110 is turned back on (step 612), and production tape operations is resumed (step 614), production tape operations are performed (step 600), and monitoring for trigger events is performed again (step 602).

In various embodiments, performing the tape head cycles may be viewed as preemptive operations to reduce the build-up of accumulations on the tape head. In these embodiments, the tape head cycles may be performed often, without regard to whether performance degradation of the read elements is detected. For example, a full wrap tape head cycle may be performed after a certain number of wraps, for example, 10 or 20 wraps, of the tape cartridge during standard production tape processing. At one tape head cycle wrap per 10 production wraps, the production tape processing time increase may be as great as about 10%.

Figure 7:
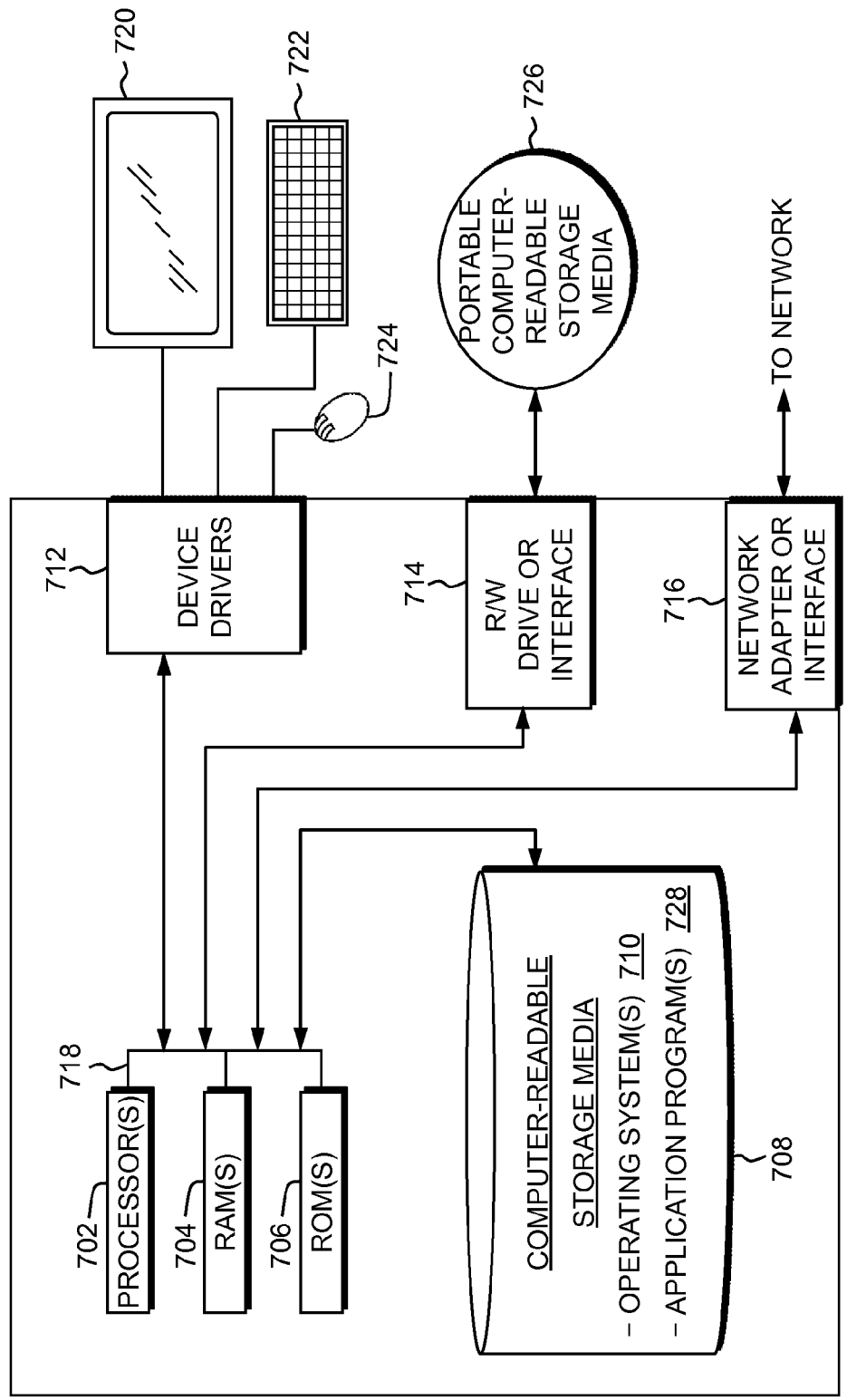
FIG. 7 illustrates a block diagram of components of a host computer, in accordance with an embodiment of the present invention.

FIG. 7 depicts a block diagram of components of host CPU 102, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Host CPU 102 can include one or more processors 702, one or more computer-readable RAMs 704, one or more computer-readable ROMs 706, one or more computer-readable storage media 708, device drivers 712, read/write drive or interface 714, network adapter or interface 716, all interconnected over a communications fabric 718. Communications fabric 718 can be implemented with any architecture designed for passing data and/or control information between processors (such as microprocessors, communications and network processors, etc.), system memory, peripheral devices, and any other hardware components within a system.

One or more operating systems 710 and application program(s) 728 are stored on one or more of the computer-readable storage media 708 for execution by one or more of the processors 702 via one or more of the respective RAMs 704 (which typically include cache memory). In the illustrated embodiment, each of the computer-readable storage media 708 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Host CPU 102 can also include a R/W drive or interface 714 to read from and write to one or more portable computer-readable storage media 726. Application program(s) 728 on host CPU 102 can be stored on one or more of the portable computer-readable storage media 726, read via the respective R/W drive or interface 714 and loaded into the respective computer-readable storage media 708.

Host CPU 102 can also include a network adapter or interface 716, such as a TCP/IP adapter card or wireless communication adapter (such as a 4G wireless communication adapter using OFDMA technology). Application program(s) on host CPU 102 can be downloaded to the computing device from an external computer or external storage device via a network (for example, the Internet, a local area network or other, wide area network or wireless network) and network adapter or interface 716. From the network adapter or interface 716, the programs are loaded into the computer-readable storage media 708. The network may comprise copper wires, optical fibers, wireless transmission, routers, firewalls, switches, gateway computers and/or edge servers.

Host CPU 102 can also include a display screen 720, a keyboard or keypad 722, and a computer mouse or touchpad 724. Device drivers 712 interface to display screen 720 for imaging, to keyboard or keypad 722, to computer mouse or touchpad 724, and/or to display screen 720 for pressure sensing of alphanumeric character entry and user selections. The device drivers 712, R/W drive or interface 714 and network adapter or interface 716 can comprise hardware and software (stored in computer-readable tangible storage device 708 and/or ROM 706).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for preventing accumulations on read/write (R/W) elements of a tape appliance tape head, the method comprising:
   turning off, by a processor, power and current to the R/W elements of the tape head; and
   performing, by the processor, a tape head cycle using a tape cartridge, while the power and current to the R/W elements of the tape head is turned off.

2. A method in accordance with claim 1,
   wherein the tape cartridge is a standard tape cartridge, and
   wherein the method further comprises suspending, by the processor, tape processing of the standard tape cartridge; and
   wherein performing a tape head cycle using a tape cartridge further comprises:
   performing, by the processor, a tape head cycle using the standard tape cartridge; and
   wherein the method further comprises resuming, by the processor, the tape processing of the standard tape cartridge.

3. A method in accordance with claim 1,
   wherein the method further comprises detecting, by the processor, one or more of: performance of the tape head does not meet a threshold value, a defined number of tape cartridge wraps have occurred, and a defined number of tape appliance operating hours have elapsed; and
   wherein turning off power and current to the R/W elements of the tape head is at least partially responsive to the detecting.

4. A method in accordance with claim 2,
   wherein the method further comprises detecting, by the processor, one or more of: performance of the tape head does not meet a threshold value during tape processing of the standard tape cartridge, a defined number of wraps of the standard tape cartridge have occurred, and a defined number of tape appliance operating hours have elapsed; and
   wherein suspending the tape processing of the standard tape cartridge is at least partially responsive to detecting that performance of the tape head does not meet the threshold value during tape processing of the standard tape cartridge.

5. A method in accordance with claim 2, wherein performing the tape head cycle includes executing one or more wraps of the standard tape cartridge over the tape appliance tape head at a production tape speed.

6. A tape appliance, comprising:
   read/write (R/W) elements of a tape appliance tape head; and
   a processor operated to: turn off power and current to the R/W elements of the tape head; and perform a tape head cycle using a tape cartridge, while the power and current to the R/W elements of the tape head is turned off.

7. A tape appliance in accordance with claim 6,
   wherein the tape cartridge is a standard tape cartridge, and
   wherein the processor is further operated to suspend tape processing of the standard tape cartridge; and
   wherein performing a tape head cycle using a tape cartridge further comprises:
   performing a tape head cycle using the standard tape cartridge; and
   wherein the processor is further operated to resume the tape processing of the standard tape cartridge.

8. A tape appliance in accordance with claim 6,
   wherein the processor is further operated to detect one or more of: performance of the tape head does not meet a threshold value, a defined number of tape cartridge wraps have occurred, and a defined number of tape appliance operating hours have elapsed; and
   wherein turning off power and current to the R/W elements of the tape head is at least partially responsive to the detecting.

9. A tape appliance in accordance with claim 7,
   wherein the processor is further operated to detect one or more of: performance of the tape head does not meet a threshold value during tape processing of the standard tape cartridge, a defined number of wraps of the standard tape cartridge have occurred, and a defined number of tape appliance operating hours have elapsed; and
   wherein suspending the tape processing of the standard tape cartridge is at least partially responsive to detecting that performance of the tape head does not meet the threshold value during tape processing of the standard tape cartridge.

10. A tape appliance in accordance with claim 7, wherein performing the tape head cycle includes executing one or more wraps of the standard tape cartridge over the tape appliance tape head at a production tape speed.

* * * * *